United States Patent
Bromenshenkel et al.

(10) Patent No.: US 8,516,381 B2
(45) Date of Patent: Aug. 20, 2013

(54) SUGGESTION OF USER ACTIONS IN A VIRTUAL ENVIRONMENT BASED ON ACTIONS OF OTHER USERS

(71) Applicant: International Business Machines Corporation, Armonk, NY (US)

(72) Inventors: Derek L. Bromenshenkel, Rochester, MN (US); Zachary A. Garbow, Rochester, MN (US); Daniel L. Hiebert, Pine Island, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/712,028

(22) Filed: Dec. 12, 2012

(65) Prior Publication Data

US 2013/0104058 A1 Apr. 25, 2013

Related U.S. Application Data

(63) Continuation of application No. 11/869,830, filed on Oct. 10, 2007.

(51) Int. Cl.
*G06F 3/048* (2013.01)

(52) U.S. Cl.
USPC .......................................... 715/757; 715/706

(58) Field of Classification Search
USPC .................................................. 715/706, 757
See application file for complete search history.

(56) References Cited

U.S. PATENT DOCUMENTS

| | | | |
|---|---|---|---|
| 5,884,029 A | 3/1999 | Brush, II et al. |
| 5,983,003 A | 11/1999 | Lection et al. |
| 6,175,842 B1 | 1/2001 | Kirk et al. |
| 7,036,082 B1 | 4/2006 | Dalrymple et al. |
| 2002/0113809 A1 | 8/2002 | Akazawa et al. |
| 2005/0143138 A1 | 6/2005 | Lee et al. |
| 2006/0178985 A1 | 8/2006 | Jung et al. |
| 2006/0293921 A1 | 12/2006 | McCarthy et al. |
| 2007/0101276 A1 | 5/2007 | Yuen |
| 2007/0150368 A1 | 6/2007 | Arora et al. |
| 2008/0235581 A1 | 9/2008 | Caporale et al. |
| 2008/0301568 A1 | 12/2008 | Im et al. |
| 2009/0094535 A1 | 4/2009 | Bromenshenkel et al. |
| 2009/0100351 A1 | 4/2009 | Bromenshenkel et al. |

*Primary Examiner* — Andrea Leggett
(74) *Attorney, Agent, or Firm* — Patterson & Sheridan LLP

(57) ABSTRACT

Embodiments of the invention provide techniques for suggesting actions to users of an immersive virtual environment based on previous user actions within the virtual environment. Generally, characteristics of actions performed by various users of the virtual environment may be stored in a searchable actions index. Subsequently, the actions index may be used to suggest actions based on similarity of the stored characteristics to those of a current user and/or actions. The suggested actions may be presented to the user as graphical indications visible within the user's view of the virtual environment.

20 Claims, 6 Drawing Sheets

SUGGESTION OF USER ACTIONS IN A VIRTUAL ENVIRONMENT BASED ON ACTIONS OF OTHER USERS

CROSS-REFERENCE TO RELATED APPLICATIONS

This application is a continuation of co-pending U.S. patent application Ser. No. 11/869,830, filed Oct. 10, 2007. The aforementioned related patent application is herein incorporated by reference in its entirety.

BACKGROUND

1. Field of the Invention

Embodiments of the invention relate to immersive virtual environment presentation. More specifically, embodiments of the invention relate to presenting users with suggested actions that may be performed within the immersive virtual environment.

2. Description of the Related Art

A virtual world is a simulated environment in which users may inhabit and interact with one another via avatars. Users may also interact with virtual objects and locations of the virtual world. An avatar generally provides a graphical representation of an individual within the virtual world environment. Avatars are usually presented to other users as two or three-dimensional graphical representations of humanoids. Frequently, virtual worlds allow for multiple users to enter and interact with one another. Virtual worlds provide an immersive environment as they typically appear similar to the real world, with real world rules such as gravity, topography, locomotion, real-time actions, and communication. Communication may be in the form of text messages sent between avatars, but may also include real-time voice communication.

Virtual worlds may be persistent. A persistent world provides an immersive environment (e.g., a fantasy setting used as a setting for a role-playing game, or a virtual world complete with land, buildings, towns, and economies) that is generally always available, and world events happen continually, regardless of the presence of a given avatar. Thus, unlike more conventional online games or multi-user environments, the virtual world continues to exist, and plot and events continue to occur as users enter (and exit) the virtual world.

SUMMARY

One embodiment of the invention includes a computer-implemented method, computer-readable storage medium, and a system for suggesting actions to a first user in a virtual environment. The method, storage medium, and system identify a plurality of users of the virtual environment, where each user is associated with a respective user history that records actions performed in the virtual environment by each respective user. Each user history includes one or more characteristics of the respective user, including at least one of (i) an employer name, (ii) an occupation, (iii) an indication of one or more personal interests, and (iv) demographic data. The method, storage medium, and system match the first user with one or more of the plurality of users based on the one or more characteristics of the respective user. The method, storage medium, and system determine, for a current location of a first user avatar representing the first user in the virtual environment, one or more suggested actions for the first user to perform in the virtual environment using the first user avatar. The suggested action is selected from the actions recorded in the user histories of the one or more of the plurality of users matched with the first user based on the suggested action being performed previously by a respective avatar of the one or more of the plurality of users at the current location of the first user avatar in the virtual environment. The method, storage medium, and system present the determined one or more suggested actions to the first user.

BRIEF DESCRIPTION OF THE SEVERAL VIEWS OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Figure 1:
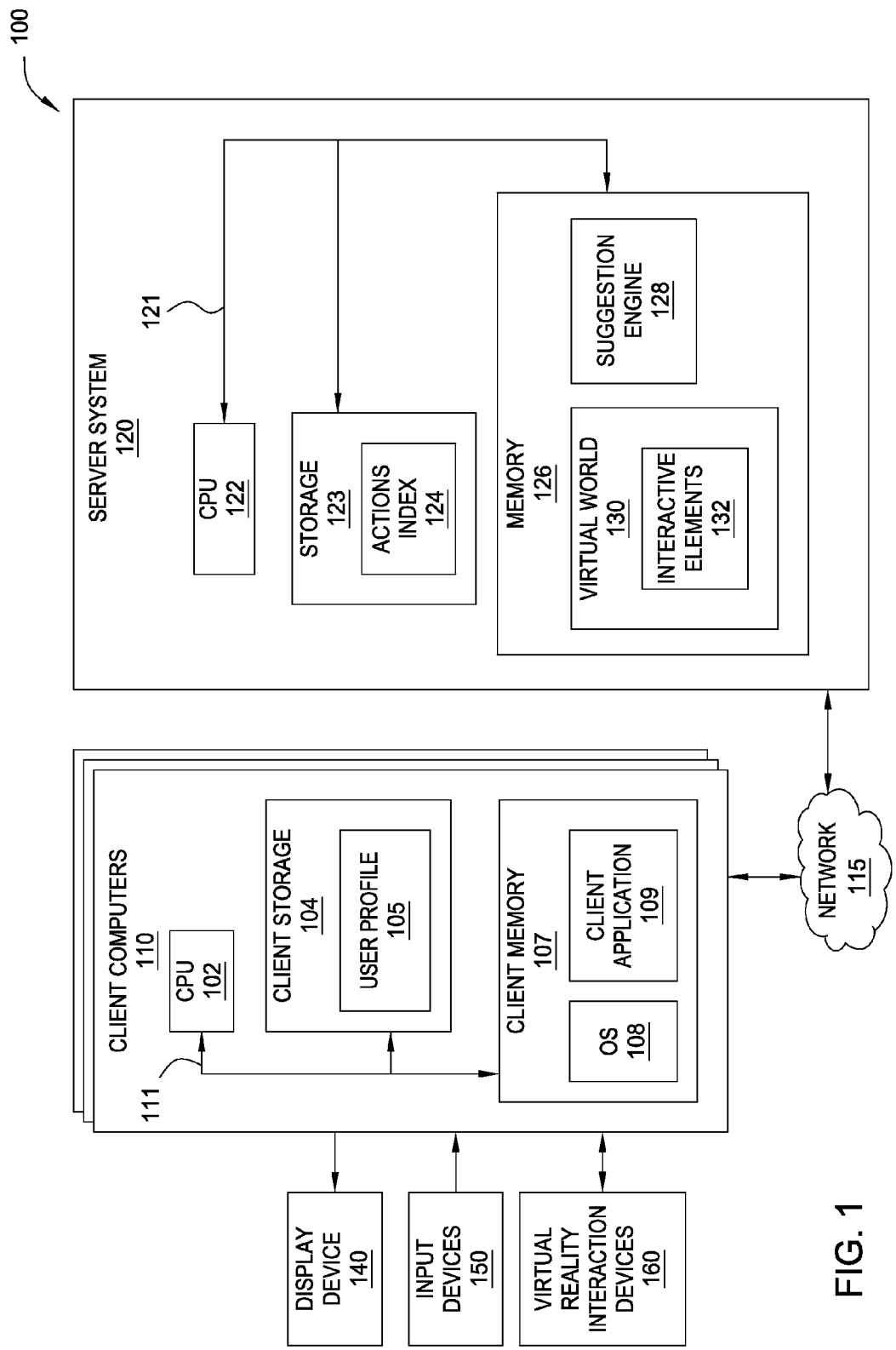
FIG. 1 is a block diagram that illustrates a client server view of computing environment, according to one embodiment of the invention.

A virtual world is a simulated environment in which users may be represented by avatars. An avatar may be used to "travel" through locations of the virtual world, such as virtual streets, buildings, rooms, etc. While in a given location, an avatar may also be used to interact with objects or other avatars present therein. For example, an avatar visiting a display room of a store may be able to interact with virtual products on display. In another example, a user in a hallway may be able to open any one of multiple doors present in the hallway, with each door opening to a different room. As used herein, the term "interactive elements" refers to the elements of a virtual world that a user may interact with (e.g., locations, objects, avatars, etc.).

However, a user visiting an unfamiliar location may not know what actions are available in the location, or what elements of the location may be interacted with, or what actions may be performed with a given element. Of course, a user may determine this information by a process of trial and error. However, this approach may be tedious and time-consuming. Additionally, some users may only wish to perform actions suited to their particular requirements and interests. For example, a user interested in computer gaming may wish to perform actions related to gaming (e.g., visit a game demonstration, initiate a game, etc.), but may not be interested in actions available to a business user (e.g., visit a conference room or view a sales presentation, etc.). Alternatively, a user may be provided with instructions on available actions at a given virtual location. For example, a user may participate in on-line training (e.g., videos, guided tours, etc.), or may read help documentation. However, providing such instructions may require extensive time and effort to prepare and present.

Embodiments of the invention provide techniques for suggesting actions to users of an immersive virtual environment. Generally, characteristics of actions performed by various users of the virtual environment may be stored in a searchable actions index. Such characteristics may include user profiles, target objects, time data, location data, and the like. Subsequently, the actions index may be used to suggest actions based on similarity of the stored characteristics to those of a current user and/or actions. The suggested actions may be presented to the user as graphical indications visible within the user's view of the virtual environment.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive and DVDs readable by a DVD player) on which information is permanently stored; and (ii) writable storage media (e.g., floppy disks within a diskette drive, a hard-disk drive or random-access memory) on which alterable information is stored. Such computer-readable storage media, when carrying computer-readable instructions that direct the functions of the present invention, are embodiments of the present invention. Other media include communications media through which information is conveyed to a computer, such as through a computer or telephone network, including wireless communications networks. The latter embodiment specifically includes transmitting information to/from the Internet and other networks. Such communications media, when carrying computer-readable instructions that direct the functions of the present invention, are embodiments of the present invention. Broadly, computer-readable storage media and communications media may be referred to herein as computer-readable media.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

FIG. 1 is a block diagram that illustrates a client server view of computing environment 100, according to one embodiment of the invention. As shown, computing environment 100 includes client computers 110, network 115 and server system 120. In one embodiment, the computer systems illustrated in environment 100 may include existing computer systems, e.g., desktop computers, server computers, laptop computers, tablet computers, and the like. The computing environment 100 illustrated in FIG. 1, however, is merely an example of one computing environment. Embodiments of the present invention may be implemented using other environments, regardless of whether the computer systems are complex multi-user computing systems, such as a cluster of individual computers connected by a high-speed network, single-user workstations, or network appliances lacking non-volatile storage. Further, the software applications illustrated in FIG. 1 and described herein may be implemented using computer software applications executing on existing computer systems, e.g., desktop computers, server computers, laptop computers, tablet computers, and the like. However, the software applications described herein are not limited to any currently existing computing environment or programming language, and may be adapted to take advantage of new computing systems as they become available.

As shown, each client computer 110 includes a central processing unit (CPU) 102, which obtains instructions and data via a bus 111 from client memory 107 and client storage 104. CPU 102 is a programmable logic device that performs all the instruction, logic, and mathematical processing in a computer. Client storage 104 stores application programs and data for use by client computer 110. Client storage 104 includes hard-disk drives, flash memory devices, optical media and the like. Client computer 110 is operably connected to the network 115.

Client memory 107 includes an operating system (OS) 108 and a client application 109. Operating system 108 is the software used for managing the operation of the client computer 110. Examples of OS 108 include UNIX, a version of the Microsoft Windows® operating system, and distributions of the Linux® operating system. (Note, Linux is a trademark of Linus Torvalds in the United States and other countries.)

In one embodiment, client application 109 provides a software program that allows a user to connect to a virtual world 130, and once connected, to perform various user actions. Such actions may include exploring virtual locations, interacting with other avatars, and interacting with virtual objects. Further, client application 109 may be configured to generate and display a visual representation of the user within the immersive environment, generally referred to as an avatar. The avatar of the user is generally visible to other users in the virtual world, and the user may view avatars representing the other users. The client application 109 may also be configured to generate and display the immersive environment to the user and to transmit the user's desired actions to virtual world 130 on server 120. Such a display may include content from the virtual world determined from the user's line of sight at any given time. For the user, the display may include the avatar of that user or may be a camera eye where the user sees the virtual world through the eyes of the avatar representing this user.

The user may view the virtual world using a display device 140, such as an LCD or CRT monitor display, and interact with the client application 109 using input devices 150. Further, in one embodiment, the user may interact with client application 109 and virtual world 130 using a variety of virtual reality interaction devices 160. For example, the user may don a set of virtual reality goggles that have a screen display for each lens. Further, the goggles could be equipped with motion sensors that cause the view of the virtual world presented to the user to move based on the head movements of the individual. As another example, the user could don a pair of gloves configured to translate motion and movement of the user's hands into avatar movements within the virtual reality environment. Of course, embodiments of the invention are not limited to these examples and one of ordinary skill in the art will readily recognize that the invention may be adapted for use with a variety of devices configured to present the virtual world to the user and to translate movement/motion or other actions of the user into actions performed by the avatar representing that user within virtual world 130.

As shown, client storage 104 may include a user profile 105. In one embodiment, user profile 105 stores data describing a user of client application 109 on a particular client 110. For example, user profile 105 may describe the user's employment, such as company name, job title, experience, skills, etc. User profile 105 may also describe the user's interests, such as gaming, movies, travel, etc. Additionally, user profile 105 may describe the user's demographics, e.g., age, sex, religion, language, physical location, etc.

In one embodiment, server system 120 includes a CPU 122, which obtains instructions and data via a bus 121 from memory 126 and storage 124. The processor 122 could be any processor adapted to support the methods of the invention. The memory 126 is any memory sufficiently large to hold the necessary programs and data structures. Memory 126 could be one or a combination of memory devices, including Random Access Memory, nonvolatile or backup memory, (e.g., programmable or Flash memories, read-only memories, etc.). In addition, memory 126 and storage 124 may be considered to include memory physically located elsewhere in a server 120, for example, on another computer coupled to the server 120 via bus 121. Server 120 may be operably connected to the network 115, which generally represents any kind of data communications network. Accordingly, the network 115 may represent both local and wide area networks, including the Internet.

Memory 126 includes virtual world 130 and a suggestion engine 128. In one embodiment, virtual world 130 may be a software application that allows a user to explore and interact with an immersive environment. Illustratively, virtual world 130 includes interactive elements 132. As described, interactive elements 132 may include elements such as virtual locations, virtual objects, other avatars, and the like. In one embodiment, suggestion engine 128 may provide a software application configured to collect data describing actions performed by users of virtual world 130. The collected data may include the user profile 105 describing the user performing the action (e.g., employment, interests, or demographics, characteristics of the user, etc.) and any interactive elements 132 affected by the user's action. The collected data may also include preceding actions (i.e., other actions performed before the current action). Further, the collected data may include time characteristics, such as time of day, frequency of occurrence, duration, etc. Furthermore, the collected data may include location characteristics, such as a location of the user performing the action, a location of an affected interactive element 132, a location of the affected interactive element 132 in the viewport of the user, etc.

In one embodiment, the collected data may be stored in an actions index 124 included in storage 123. The data describing each action may be stored as a separate record of actions index 124. Alternatively, the descriptive data may be stored in aggregated form, for example as statistical data describing a plurality of actions. Suggestion engine 128 may process data from actions index 124 to provide a user of virtual world 130 with suggested actions. More specifically, suggestion engine 128 may be configured to match characteristics of the current user and/or actions to the characteristics of actions stored in actions index 124 or to the characteristics of actions performed by other users. If a match is found, the action described in actions index 124 may be presented to the user as a suggested action. Generally, user characteristics that may be matched to the actions index 124 may include user action(s), user profile, user location, etc. These characteristics may be evaluated alone or in combination, or may be weighed in order of preference. Additionally, other characteristics may also be matched to actions index 124, as may be suited to a particular application.

Figure 2A:
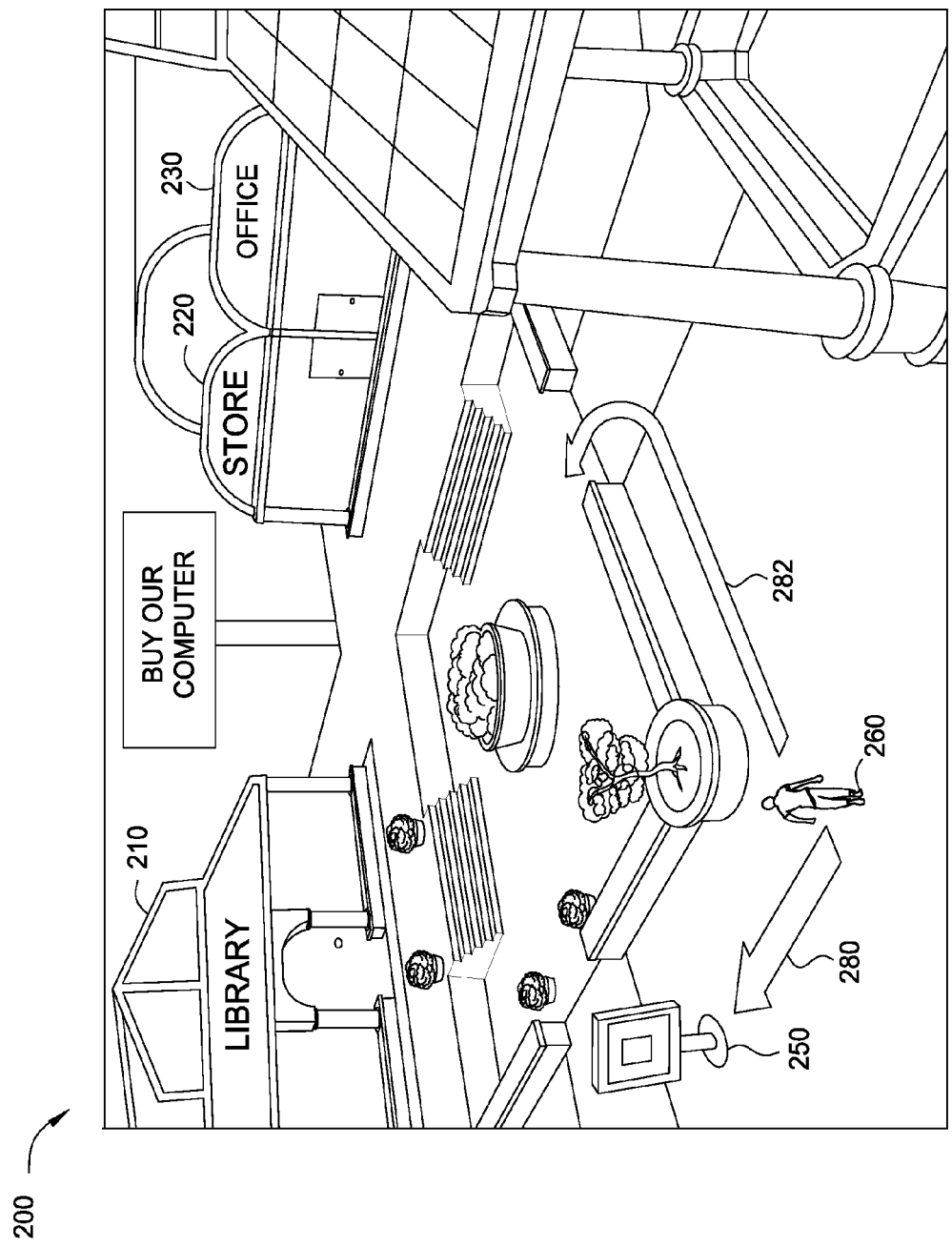
FIGS. 2A-2C illustrate a user display for a user participating in a virtual world, according to one embodiment of the invention.
Figure 2B:
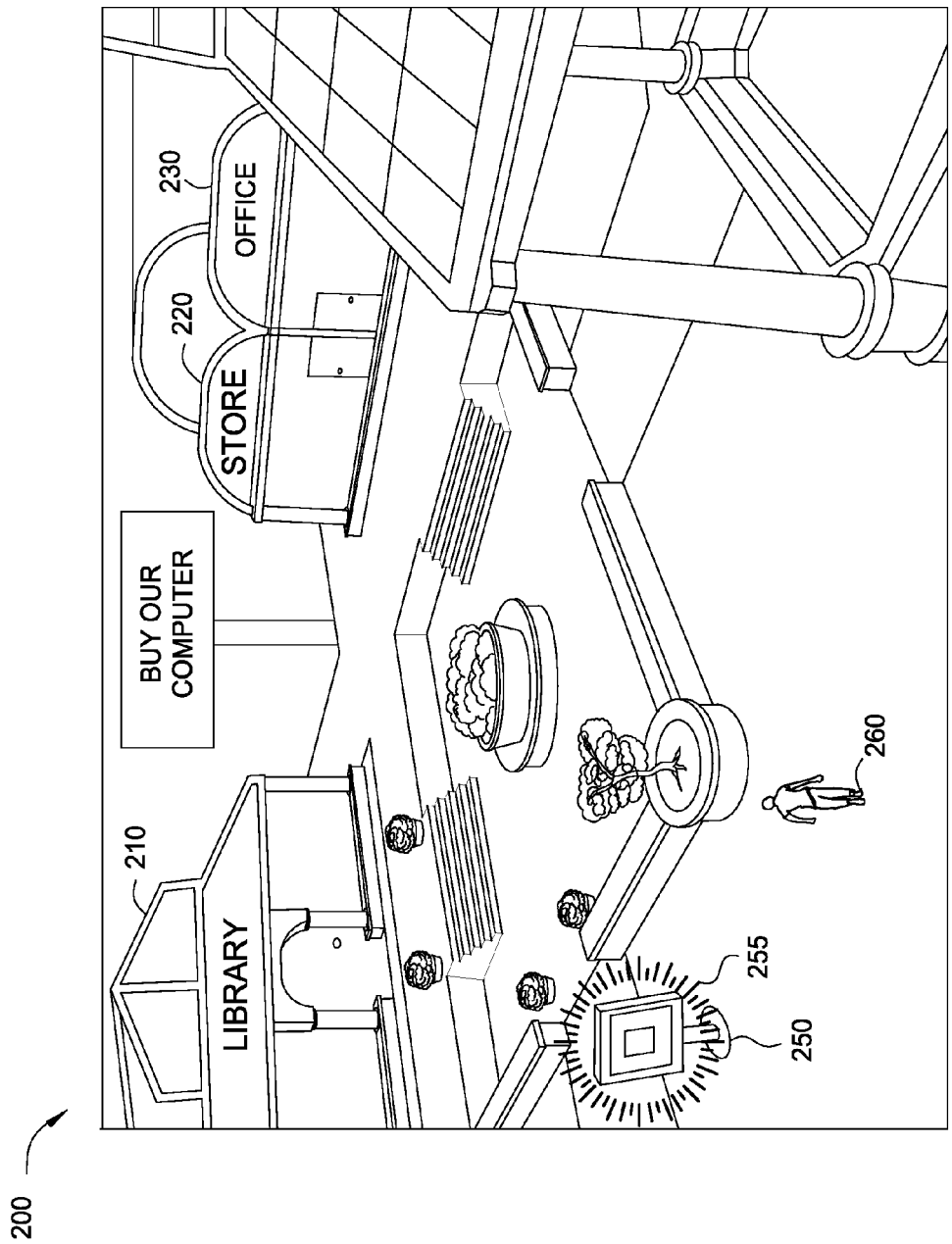
Figure 2C:
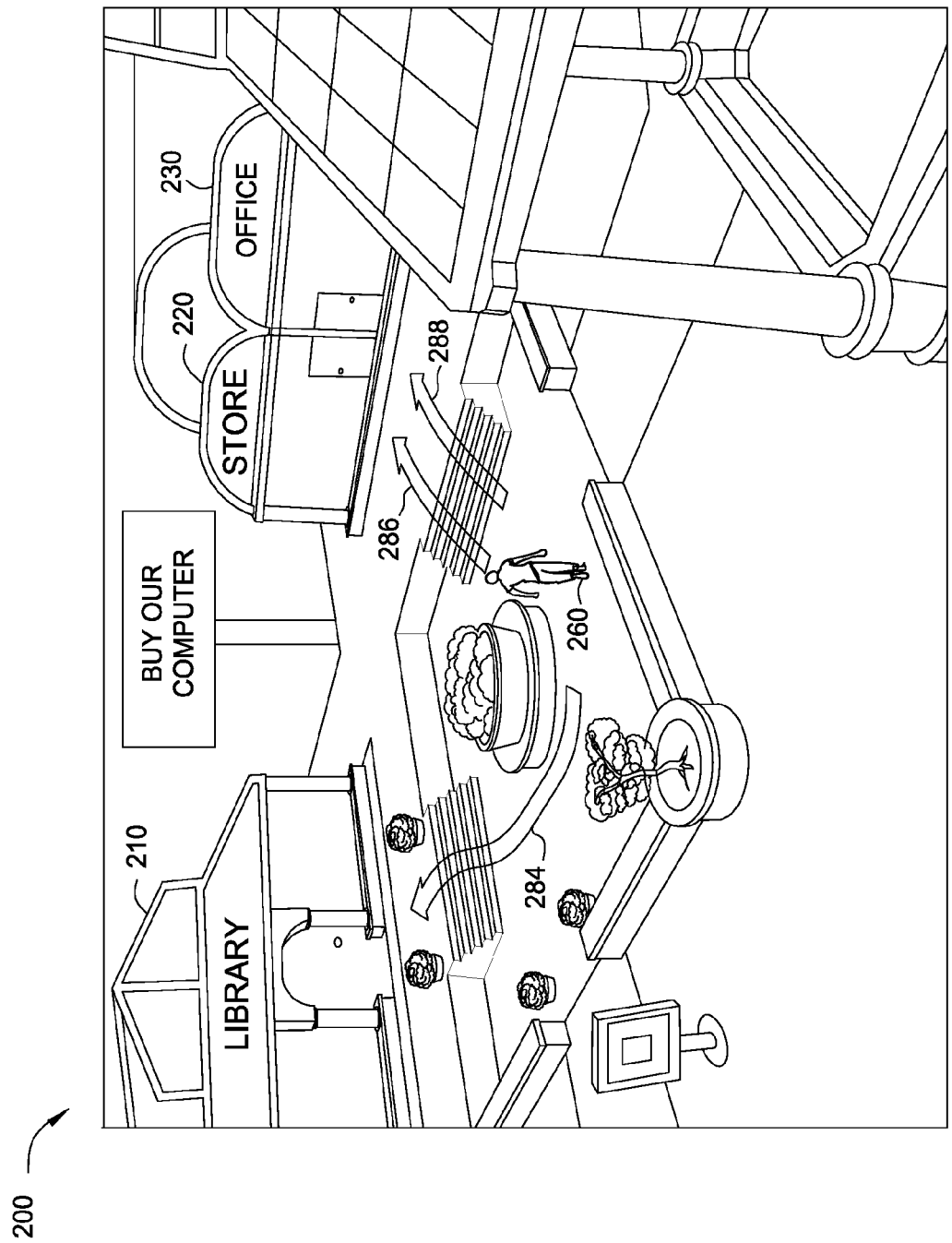

In one embodiment, suggestion engine 128 may also be configured to present suggested actions to the user. The suggested actions may be presented to the user using graphical indications which may be visible in a user display of the virtual world. FIGS. 2A-2C illustrate a user display 200 for a user interacting with a virtual world, according to one embodiment of the invention. As shown in FIG. 2A, the user may be represented by avatar 260. In this example, avatar 260 is located in a virtual "town square" which includes multiple interactive elements, such as a library 210, a store 220, an office 230, and a kiosk 250. Note that user display 200 includes an arrow 280 and an arrow 282. In one embodiment, arrows 280 and 282 may be graphical indications of suggested actions available to avatar 260. More specifically, arrow 280 represents the suggested action of interacting with kiosk 250. Similarly, arrow 282 represents the suggested action of traveling to a central position in the "town square." The suggested actions represented by arrows 280 and 282 may be generated by suggestion engine 128 by matching the current user to the actions index 124, as described above.

Of course, one of skill in the art will recognize that suggested actions may be represented by a variety of graphical indications. For example, note that in FIG. 2A, arrow 280 is depicted as thicker than arrow 282. In one embodiment, the display characteristics of an arrow may indicate that the represented action is more strongly "suggested" (i.e., better matched to the current user) than another action. In another embodiment, arrows representing actions may be shown in different colors or levels of brightness to indicate relative strength of suggestion (or other descriptive aspects). In yet another embodiment, actions may be indicated by text or symbols. For example, a virtual door may be displayed with the text "ENTER" to indicate a suggested action.

In yet another embodiment, a suggested action directed to an interactive element 132 may be presented as a visual indicator associated to the element itself. For example, FIG. 2B illustrates kiosk 250 as having a highlight effect 255, according to one embodiment of the invention. The highlight effect 255 may be used instead of arrow 280 to indicate a suggested interaction with kiosk 250. In another example, a suggested action may be represented by an animation overlaid on the element. Such an animation may illustrate, e.g., how an interactive element 132 may be operated by the user. In other examples, suggested actions may be indicated by colors or borders applied to the interactive elements.

Returning to FIG. 2A, assume that the user selects the arrow 282. As a result, avatar 260 may automatically perform the suggested action, namely to "travel" to a new location. This result is illustrated in FIG. 2C, where the user is presented with three new arrows 284, 286, and 288, representing a new set of suggested actions. More specifically, arrows 284, 286, and 288 represent the suggested actions of entering library 210, store 220, or office 230, respectively. In one embodiment, the suggested actions may be based on the avatar's new location. That is, the avatar's location may be matched to actions index 124, and may be used to determine subsequent actions taken by users who previously where in the same location. In another embodiment, the suggested actions may be based on the avatar's prior actions. That is, the sequence of the avatar's prior actions (i.e., traveling to the town square, selecting arrow 282, etc.) may be matched to actions index 124, and may be used to determine subsequent actions taken by users who followed the same (or similar) sequence of actions. In yet another embodiment, the suggested actions may be based on the user's profile. For example, data included in the user profile 105 (e.g., employment, interests, demographics, etc.) may be matched to actions index 124, and may be used to determine subsequent actions taken by users who have similar profiles. In yet another embodiment, user profile 105 may also include user preferences for handling suggested actions. User preferences may include, e.g., whether to display suggested actions to the user, the user's preferred type of graphical indicator for suggested actions, whether a given user's actions are to be included in the action index 124, what weight to assign to each type of matching of the actions index (i.e., matching by user action, profile, location, etc.), and the like.

In one embodiment, the user may be able to select from a sequence of suggested actions. That is, the user may select from graphical indicators that represent a series of sequential actions, with some actions dependent on others. For example, assuming that in the situation illustrated in FIG. 2A, the user is presented with arrow 282 (as shown), as well as arrows 284, 286, and 288 (from FIG. 2C). The user may be able to make a single selection of a dependent action (e.g., arrow 284), thus resulting in the sequential performance of the actions represented by arrows 282 and 284 (e.g., travel to the town square, then travel into library 210). In one embodiment, user profile 105 may specify a number of sequential suggested actions (i.e., the number of "steps" into the future) to be presented to the user.

Of course, the embodiments described above are intended to be illustrative, and are not limiting of the invention. Other embodiments are broadly contemplated. For example, user profile 105 may be stored on server 120, rather than on client computer 110. In another example, the suggestion engine 128 may be replaced by separate components, such as a component configured to store data in the actions index 124, a component configured to suggest actions, a component to present suggested actions, etc. In yet another example, data stored in actions index 124 may be added by a developer, rather than being based on previous actions of users of the virtual world 130. That is, a developer may configure actions index 124 to suggest predetermined actions to users who match certain criteria (e.g., user profile, location, etc.).

Figure 3:
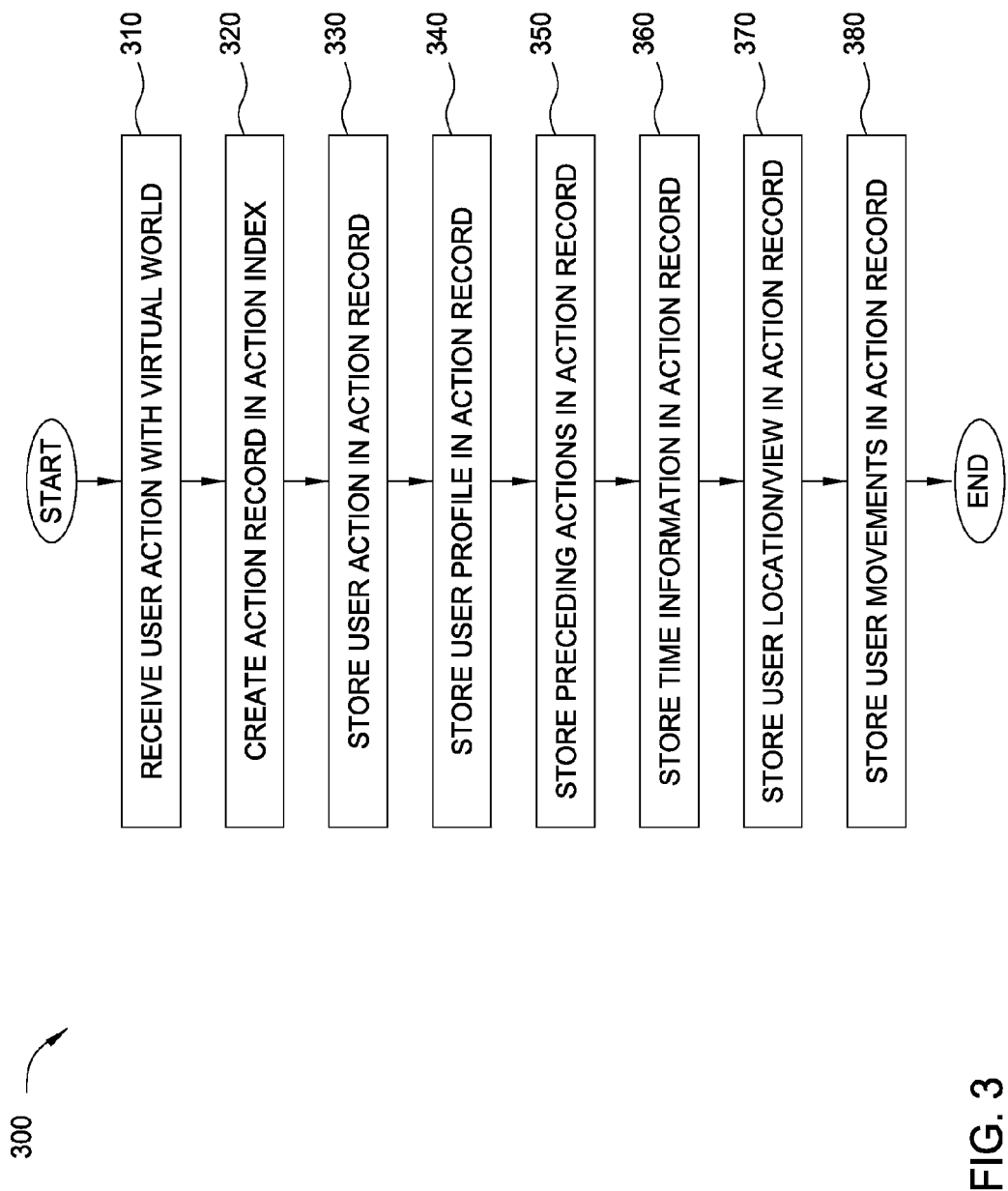
FIG. 3 is a flow diagram illustrating a method for generating a searchable actions index for use in suggesting actions to user of a virtual world, according to one embodiment of the invention.

FIG. 3 is a flow diagram illustrating a method 300 for generating a searchable index for use in suggesting actions to user of a virtual world, according to one embodiment of the invention. Persons skilled in the art will understand that, even though the method is described in conjunction with the system of FIG. 1, any system configured to perform the steps of method 300, in any order, is within the scope of the present invention.

The method 300 begins at step 310, where the virtual world software receives a user action within a virtual world (e.g., virtual world 130 illustrated in FIG. 1). Such actions may include exploring virtual locations, interacting with other avatars, interacting with virtual objects, and the like. At step 320, an action record may be created in an action index (e.g., actions index 124 illustrated in FIG. 1). In one embodiment, each action record may store data describing a single action. In another embodiment, the actions index may store data in aggregated form, for example as statistical data describing a plurality of actions. At step 330, data describing the action may be stored in the action record. For example, such data may include an action type (e.g., walk, operate, purchase, etc.), a degree of interaction involved in the action, and any interactive elements 132 involved in the action (e.g., kiosk 250, another avatar, etc.).

At step 340, a user profile may be stored in the action record (e.g., user profile 105). The user profile may include data such as employment, interests, demographics, etc. At step 350, any preceding actions may be stored in the action record. That is, the sequence of actions taken by the user prior to the present action may be stored in the action record. At step 360, data describing time characteristics of the action may be stored in the action record. Such time data may include the date and time of the action, the duration of the action, and the like. At step 370, data describing the location of the action may be stored in the action record. Such location data may include, e.g., the user's location coordinates, the user's position relative to known landmarks, etc. If the action was directed to an interactive element 132, the location may include the element's location coordinates, the element's position in the user's view of the virtual world, the element's distance to the user when the action place, etc.

At step 380, data describing the user's movements may be stored in the action record. The movement data may represent the action itself, or may represent preceding actions. Alternatively, the movement data may describe movement taking place simultaneous to the user action. For example, assume the user action received at step 310 is talking to another avatar while walking through the town square. In such a case, the user action of talking may be stored in the action record, and the user's movements may be stored as descriptive data at step 380. The movement data may be stored in any suitable manner. For example, movement data may be stored as time and space coordinates, with each set of coordinates captured at predetermined increments of time or distance. Alternatively, each movement may be stored as segments defined by a starting point and an ending point. A new segment may be initiated after a complete stop, or after a significant change of speed (i.e., change greater than some predefined threshold). The movement data may also be stored in vector form (i.e., starting point, direction, and length). After step 380, the method 300 terminates. Of course, method 300 is provided for illustrative purposes only, and is not limiting of the invention. It is contemplated that the steps of method 300 may be modified to incorporate other data describing user interactions into the user index. Such modifications may be made to suit particular situations, and are thus contemplated to be in the scope of the invention.

Figure 4:
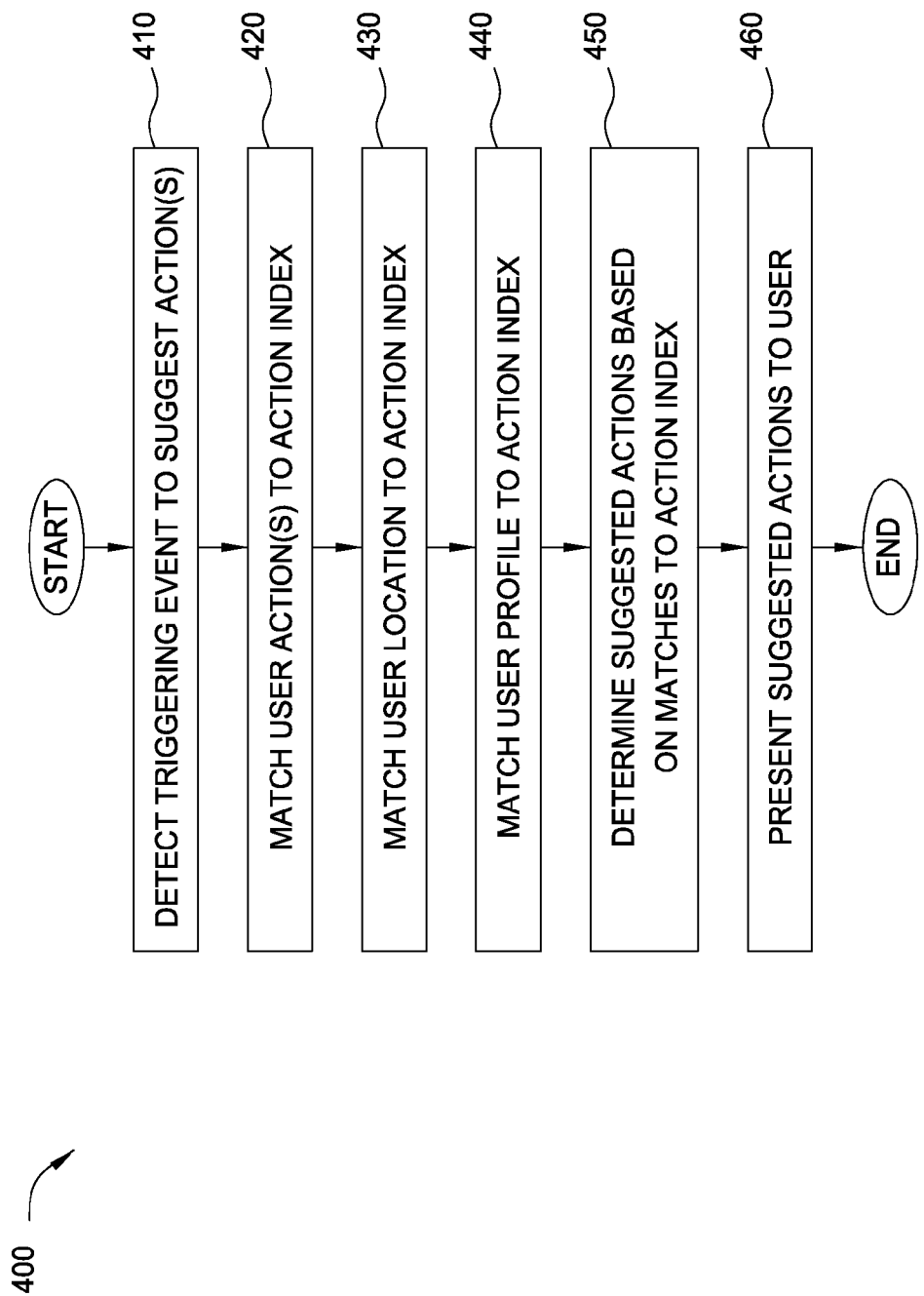
FIG. 4 is a flow diagram illustrating a method for suggesting actions to users of a virtual world, according to one embodiment of the invention.

FIG. 4 is a flow diagram illustrating a method 400 for suggesting actions to users of a virtual world, according to one embodiment of the invention. For the sake of illustration, method 400 is described in conjunction with the system of FIG. 1. Specifically, the steps of method 400 may be assumed to be performed by the suggestion engine 128 illustrated in FIG. 1. However, persons skilled in the art will understand that any system configured to perform the steps of method 400, in any order, is within the scope of the present invention.

The method 400 begins at step 410, where the virtual-world software detects a triggering event to suggest actions to a user of a virtual world (e.g., virtual world 130). The triggering event may be an action or movement performed by the user. For example, assume the user enters the store 220 illustrated in FIG. 2A. In such a case, the action of opening the door of the store 220 may trigger the suggestion of further actions (e.g., talk to a salesperson, purchase goods, or to travel to a region of the store relevant to the individual, such as an area selling men's clothing for a user with a profile indicating that the user is male, etc.). In another embodiment, the movement of the avatar 260 into the store 220 may trigger the suggestion of further actions. That is, the trigger may be the avatar's movement across a predefined threshold or checkpoint, rather than the performance of a specific action. In yet another embodiment, the user's presence in a given location may be a triggering event. For example, the presence of avatar 260 within the store 220 may be a triggering event. In another example, at start-up, the avatar 260 may appear at a given location. The avatar's appearance may be a triggering event that results in the presentation of suggested actions available at the given location. In any case, the action choices presented to the user may be tailored based on a profile associated with the user, or with the prior actions of the user.

At step 420, a user action may be matched to an actions index (e.g., actions index 124). That is, the immediate prior action (or actions) performed by the user may be matched to the preceding actions stored in the actions index (see step 350 of method 300). At step 430, the user's location may be matched to the actions index. As described, the triggering event received at step 410 may be the user's presence in a given location. If so, the user's location may be matched to locations stored in the actions index (see step 370 of method 300). The location evaluated in this step may be based on an avatar's location, on a user view (e.g., user view 200 illustrated in FIG. 2A), etc.

At step 440, the user profile (e.g., user profile 105) may be matched to the actions index. That is, the actions index may be used to identify previous actions taken by users having a similar profile to the current user. At step 450, suggested actions may be determined from any matches to the actions index based on actions, location or user profile (i.e., the matches made in steps 420, 430, and 440). In other words, actions may be suggested to the user based on similarities to previous users and their actions. Additionally, suggested actions may be determined from any matches to time information, user movements, or other data stored in the actions index.

At step 460, any suggested actions may be presented to the user. In one embodiment, the suggested actions may be presented as graphical indicators included in the user's view of the virtual world (e.g., user display 200). Such indicators may include arrows (e.g., arrow 280 illustrated in FIG. 2A), superimposed text or symbols, highlighting of interactive elements (e.g., highlight effect 255 illustrated in FIG. 2B), animation of interactive elements, colors or borders applied to interactive elements, and the like. After step 460, the method 400 terminates.

While the foregoing is directed to embodiments of the present invention, other and further embodiments of the invention may be devised without departing from the basic scope thereof, and the scope thereof is determined by the claims that follow.

What is claimed is:

1. A computer-implemented method for suggesting actions to a first user in a virtual environment, comprising:
identifying a plurality of users of the virtual environment, wherein each user is associated with a respective user history that records actions performed in the virtual environment by each respective user, wherein each user history includes one or more characteristics of the respective user, including at least one of (i) an employer name, (ii) an occupation, (iii) an indication of one or more personal interests, and (iv) demographic data;
matching the first user with one or more of the plurality of users based on the one or more characteristics of the respective user;
determining, for a current location of a first user avatar representing the first user in the virtual environment, one or more suggested actions for the first user to perform in the virtual environment using the first user avatar, the suggested action being selected from the actions recorded in the user histories of the one or more of the plurality of users matched with the first user based on the suggested action being performed previously by a respective avatar of the one or more of the plurality of users at the current location of the first user avatar in the virtual environment; and
presenting the determined one or more suggested actions to the first user.

2. The computer-implemented method of claim 1, wherein the first user is associated with one or more characteristics including at least one of (i) an employer name, (ii) an occupation, (iii) an indication of one or more personal interests, and (iv) demographic data, wherein matching the first user with one or more of the plurality of users comprises:
comparing the one or more characteristics of the plurality of users to the one or more characteristics of the first user.

3. The computer-implemented method of claim 1, further comprising monitoring the first user interacting with the virtual environment, wherein the first user is associated with a first user history that records actions performed by the first user in the virtual environment.

4. The computer-implemented method of claim 3, wherein each recorded action in the first user history includes at least one of (i) a type of activity describing the recorded action, (ii) a degree of user involvement in performing the recorded action, and (iii) descriptions of any elements of the virtual environment that the user interacted with in performing the recorded action.

5. The computer-implemented method of claim 3, wherein each recorded action in the first user history includes a description of one or more preceding actions, wherein the one or more preceding actions were performed by the first user prior to performing the recorded action, and wherein the preceding action is used to match the first user with the one or more of the plurality of users.

6. The computer-implemented method of claim 5, wherein the one or more preceding actions include one or more movements of a user avatar within the virtual environment.

7. The computer-implemented method of claim 3, wherein each recorded action in the first user history includes one or more time characteristics, wherein the one or more time characteristics include at least one of a time of occurrence and a duration of the recorded action.

8. A non-transitory computer-readable storage medium including a program, which when executed on a processor performs an operation for suggesting actions to a first user in a virtual environment, comprising:

identifying a plurality of users of the virtual environment, wherein each user is associated with a respective user history that records actions performed in the virtual environment by each respective user, wherein each user history includes one or more characteristics of the respective user, including at least one of (i) an employer name, (ii) an occupation, (iii) an indication of one or more personal interests, and (iv) demographic data;

matching the first user with one or more of the plurality of users based on the one or more characteristics of the respective user;

determining, for a current location of a first user avatar representing the first user in the virtual environment, one or more suggested actions for the first user to perform in the virtual environment using the first user avatar, the suggested action being selected from the actions recorded in the user histories of the one or more of the plurality of users matched with the first user based on the suggested action being performed previously by a respective avatar of the one or more of the plurality of users at the current location of the first user avatar in the virtual environment; and presenting the determined one or more suggested actions to the first user.

9. The computer-readable storage medium of claim 8, wherein the first user is associated with one or more characteristics including at least one of (i) an employer name, (ii) an occupation, (iii) an indication of one or more personal interests, and (iv) demographic data, wherein matching the first user with one or more of the plurality of users comprises:

comparing the one or more characteristics of the plurality of users to the one or more characteristics of the first user.

10. The computer-readable storage medium of claim 8, further comprising monitoring the first user interacting with the virtual environment, wherein the first user is associated with a first user history that records actions performed by the first user in the virtual environment.

11. The computer-readable storage medium of claim 10, wherein each recorded action in the first user history includes at least one of (i) a type of activity describing the recorded action, (ii) a degree of user involvement in performing the recorded action, and (iii) descriptions of any elements of the virtual environment that the user interacted with in performing the recorded action.

12. The computer-readable storage medium of claim 10, wherein each recorded action in the first user history includes a description of one or more preceding actions, wherein the one or more preceding actions were performed by the first user prior to performing the recorded action, and wherein the preceding action is used to match the first user with the one or more of the plurality of users.

13. The computer-readable storage medium of claim 12, wherein the one or more preceding actions include one or more movements of a user avatar within the virtual environment.

14. The computer-readable storage medium of claim 10, wherein each recorded action in the first user history includes one or more time characteristics, wherein the one or more time characteristics include at least one of a time of occurrence and a duration of the recorded action.

15. A system, comprising:
a computer processor; and
a memory containing a program that, when executed on the computer processor, performs an operation for suggesting actions to a first user in a virtual environment, comprising:

identifying a plurality of users of the virtual environment, wherein each user is associated with a respective user history that records actions performed in the virtual environment by each respective user, wherein each user history includes one or more characteristics of the respective user, including at least one of (i) an employer name, (ii) an occupation, (iii) an indication of one or more personal interests, and (iv) demographic data;

matching the first user with one or more of the plurality of users based on the one or more characteristics of the respective user;

determining, for a current location of a first user avatar representing the first user in the virtual environment, one or more suggested actions for the first user to perform in the virtual environment using the first user avatar, the suggested action being selected from the actions recorded in the user histories of the one or more of the plurality of users matched with the first user based on the suggested action being performed previously by a respective avatar of the one or more of the plurality of users at the current location of the first user avatar in the virtual environment; and presenting the determined one or more suggested actions to the first user.

16. The system of claim 15, wherein the first user is associated with one or more characteristics including at least one of (i) an employer name, (ii) an occupation, (iii) an indication of one or more personal interests, and (iv) demographic data, wherein matching the first user with one or more of the plurality of users comprises:

comparing the one or more characteristics of the plurality of users to the one or more characteristics of the first user.

17. The system of claim 15, further comprising monitoring the first user interacting with the virtual environment, wherein the first user is associated with a first user history that records actions performed by the first user in the virtual environment.

18. The system of claim 17, wherein each recorded action in the first user history includes at least one of (i) a type of activity describing the recorded action, (ii) a degree of user involvement in performing the recorded action, and (iii) descriptions of any elements of the virtual environment that the user interacted with in performing the recorded action.

19. The system of claim 17, wherein each user history includes one or more characteristics of the respective user, including at least one of (i) an employer name, (ii) an occupation, (iii) an indication of one or more personal interests, and (iv) demographic data, and wherein the characteristics of the first user and the plurality of users are used to match the first user with the one or more of the plurality of users.

20. The system of claim 17, wherein each recorded action in the first user history includes a description of one or more preceding actions, wherein the one or more preceding actions were performed by the first user prior to performing the recorded action, and wherein the preceding action is used to match the first user with the one or more of the plurality of users.

* * * * *